United States Patent [19]

Zweighaft

[11] Patent Number: 5,191,491
[45] Date of Patent: Mar. 2, 1993

[54] METHOD AND APPARATUS FOR READING DISTORTED HELICAL STRIPES

[75] Inventor: James Zweighaft, Boulder, Colo.
[73] Assignee: Exabyte Corporation, Boulder, Colo.
[21] Appl. No.: 611,102
[22] Filed: Nov. 9, 1990
[51] Int. Cl.[5] .............................................. G11B 5/584
[52] U.S. Cl. ................................ 360/77.13; 360/77.15
[58] Field of Search ................ 360/77.13, 77.14, 77.15

[56] References Cited

U.S. PATENT DOCUMENTS

| | | | |
|---|---|---|---|
| 4,099,211 | 7/1978 | Hathaway | 360/109 |
| 4,106,065 | 8/1978 | Ravizza | 360/109 |
| 4,172,265 | 10/1979 | Sakamoto et al. | 360/70 |
| 4,404,605 | 9/1983 | Sakamoto | 360/77.17 |
| 4,420,778 | 12/1983 | Sakamoto | 360/77.16 |
| 4,486,796 | 12/1984 | Sakamoto | 360/77.17 |
| 4,581,662 | 4/1986 | Sato | 360/75 |
| 4,651,239 | 3/1987 | Omori et al. | 360/77.14 |
| 4,665,447 | 5/1987 | Odaka | 360/48 |
| 4,714,971 | 12/1987 | Sigiki et al. | 360/77.15 |
| 4,739,420 | 4/1988 | Odaka et al. | 360/77.14 |
| 4,835,628 | 5/1989 | Hinz et al. | 360/48 |
| 4,843,495 | 6/1989 | Georgis et al. | 360/77.15 |
| 4,845,577 | 7/1989 | Georgis et al. | 360/72.2 |
| 4,977,469 | 12/1990 | Yokozawa | 360/77.15 X |
| 4,984,104 | 1/1991 | Takahashi et al. | 360/77.14 |

Primary Examiner—Joseph L. Dixon
Assistant Examiner—David L. Robertson
Attorney, Agent, or Firm—Nixon & Vanderhye

[57] ABSTRACT

Method and apparatus for reading information recorded on a storage medium in helical tracks, with each track comprising a plurality of blocks of data, and with at least some of said tracks having a plurality of servo zones (ST0, ST1, ST2) recorded thereon. A servo head (S) and read heads (R1, R2) traverse original azimuthal paths, with the read heads (R1, R2) attempting to read data blocks recorded on the stripes and the servo head (S) attempting to pick up signals of the recorded servo zones. A controller (100) acquires information indicative of whether a track is distorted and selects one of the servo zones (ST0, ST1, ST2) as having a specified relationship to a potential track distortion. The controller then rewinds the storage medium and repositions the servo head (S), so that upon re-reading of the medium the servo head (S) follows a modified azimuthal path whereon the signal from the selected servo zone is prioritized relative to the other zones. The read heads (R1, R2) accordingly traverse modified azimuthal paths. In one mode, the information indicative of track distortion is obtained by monitoring unique data block identifying information (BLOCK ID). In another mode, the information indicative of track distortion is obtained from a comparison of the amplitudes of the signals from the servo zones (ST0, ST1, ST2).

12 Claims, 12 Drawing Sheets

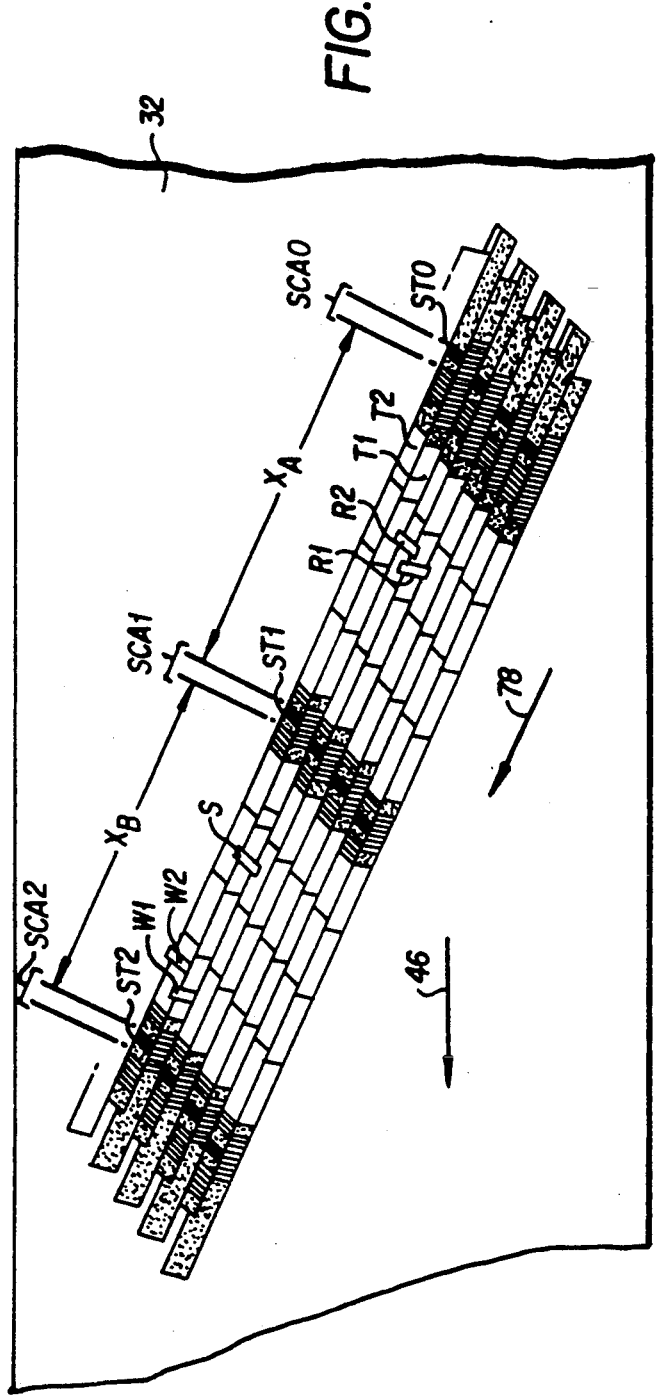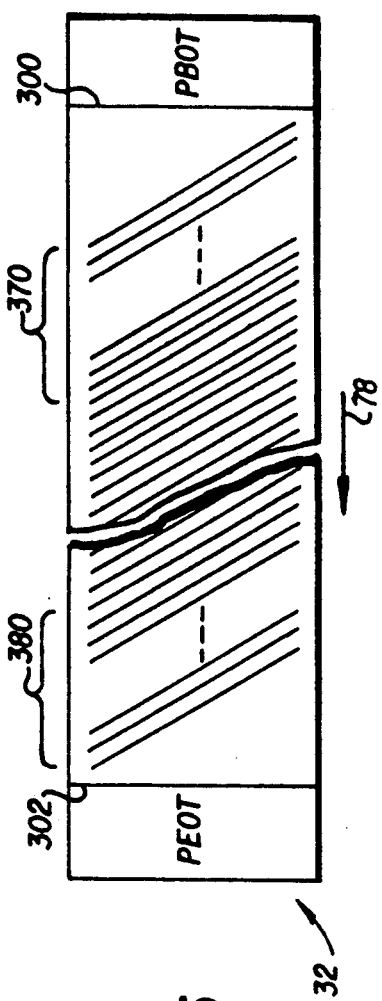

METHOD AND APPARATUS FOR READING DISTORTED HELICAL STRIPES

BACKGROUND

1. Field of Invention

This invention pertains to method and apparatus for reading information stored in helical stripes on magnetic medium, and particularly to method and apparatus for tracking servo signals embedded in helical stripes on magnetic tape in order to recover errors that occur when reading helically recorded magnetic tape having distorted tracks.

2. Prior Art and Other Considerations

Numerous prior art patents teach the recording and reading of information stored in helical stripes on magnetic tape. In a helical scan arrangement, travelling magnetic tape is partially wrapped around a rotating drum so that heads positioned on the drum are contiguous to the drum as the drum is rotated. A write head on the drum physically records data on the tape in a series of discrete stripes oriented at an angle with respect to the direction of tape travel. The data is formatted, prior to recording on the tape, to provide sufficient referencing information to enable later recovery during readout.

Among such prior art teachings are the following United States Patents, all commonly assigned herewith and incorporated herein by reference:

(1) U.S. Pat. No. 4,843,495 to Georgis et al., entitled CYCLICAL SERVO ZONE TRACKING METHOD AND APPARATUS FOR HELICAL SCAN RECORDING DEVICES;

(2) U.S. Pat. No. 4,835,638 to Hinz et al., entitled APPARATUS AND METHOD FOR FORMATTING AND RECORDING DIGITAL DATA ON MAGNETIC TAPE; and, (3) U.S. Pat. No. 4,845,577 to Georgis et al., entitled APPARATUS AND METHOD FOR ENABLING RAPID SEARCHING OF HELICALLY RECORDED MAGNETIC TAPE.

Helical scan recorders require that the read and write heads be correctly aligned with the stripes of recorded information on the magnetic tape. To this end, servo signals, sometimes referred to as "pilot" signals, are embedded in servo "zones" in each stripe. Typically there are a plurality of servo zones on each stripe.

In some prior art helical scan systems, such as U.S. Pat. No. 4,843,495 to Georgis et al. referenced above, a read head dually functions to detect servo signals provided in a stripe and to read the informational data provided in the stripe. Upon detection of the servo signals by the read head, the system determines if the position of the heads on the drum need be adjusted for correct alignment with the stripes.

In other prior art helical scan systems, a special servo head is provided on the drum to detect the servo signals and determine whether head adjustment is needed. A plurality of servo zones are sometimes provided in each stripe. In these prior art systems, servo heads typically attempt to evenly strattle two adjacent stripes. The amplitudes of the signals derived from the servo zones of the two adjacent stripes are compared. A positional adjustment of the servo head is made to equalize the amplitudes of the servo signals from the two stripes. Examples of such dual azimuth helical scan servo arrangements having such features include U.S. Pat. No. 4,528,605 to Hiraguri, U.S. Pat. No. 4,581,662 to Sato, and U.S. Pat. No. 4,665,447 to Odaka.

It is well known that operational problems may cause one or more tracks of information, helically recorded on magnetic tape storage media, to appear upon playback or reading as a distorted track.

One type of distorted track is a curved track. In this respect, problems such as those associated with the handling or guiding of a magnetic tape as it is being read may cause a track to appear as a curved track.

Various prior art schemes have been developed to compensate for the reading of curved tracks. These schemes primarily enable a track-reading head or transducer to follow the curvature of the track. Typically this is done by mounting the track-reading head upon an element (such as a bi-morph leaf) that can be deflected to permit the head to follow the curved track. Examples of such schemes are provided in U.S. Pat. No. 4,486,796 to Sakamoto; U.S. Pat. No. 4,420,778 to Sakamoto; U.S. Pat. No. 4,404,605 to Sakamoto; U.S. Pat. No. 4,172,265 to Sakamoto et al.; U.S. Pat. No. 4,099,211 to Hathaway; and, U.S. Pat. No. 4,106,065 to Ravizza.

Accordingly, it is an object of the present invention to provide servo tracking method and apparatus for allowing of data recovery when reading distorted tracks, such as curved tracks.

SUMMARY

Method and apparatus for reading information recorded on a storage medium in helical tracks, with each track comprising a plurality of blocks of data, and with at least some of said tracks having a plurality of servo zones recorded thereon. A servo head and read heads traverse original azimuthal paths, with the read heads attempting to read data blocks recorded on the stripes and the servo head attempting to pick up signals of the recorded servo zones. A controller acquires information indicative of whether a track is distorted and selects one of the servo zones as having a specified relationship to a potential track distortion. The controller then rewinds the storage medium and repositions the servo head, so that upon re-reading of the medium the servo head follows a modified azimuthal path whereon the signal from the selected servo zone is prioritized relative to the other zones. The read heads accordingly traverse modified azimuthal paths. In one mode, the information indicative of track distortion is obtained by monitoring unique data block identifying information. In another mode, the information indicative of track distortion is obtained from a comparison of the amplitudes of the signals from the servo zones.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a schematic view depicting the format of a magnetic tape recorded by or readable by the helical scan system of the embodiment of FIG. 1.

FIG. 6 is a schematic view of a plurality of stripes recorded on magnetic tape by the helical scan system of the embodiment of FIG. 1, and further showing paths of travel of heads provided on the drum of the helical scan system of the embodiment of FIG. 1

DETAILED DESCRIPTION OF THE DRAWINGS

Figure 1:
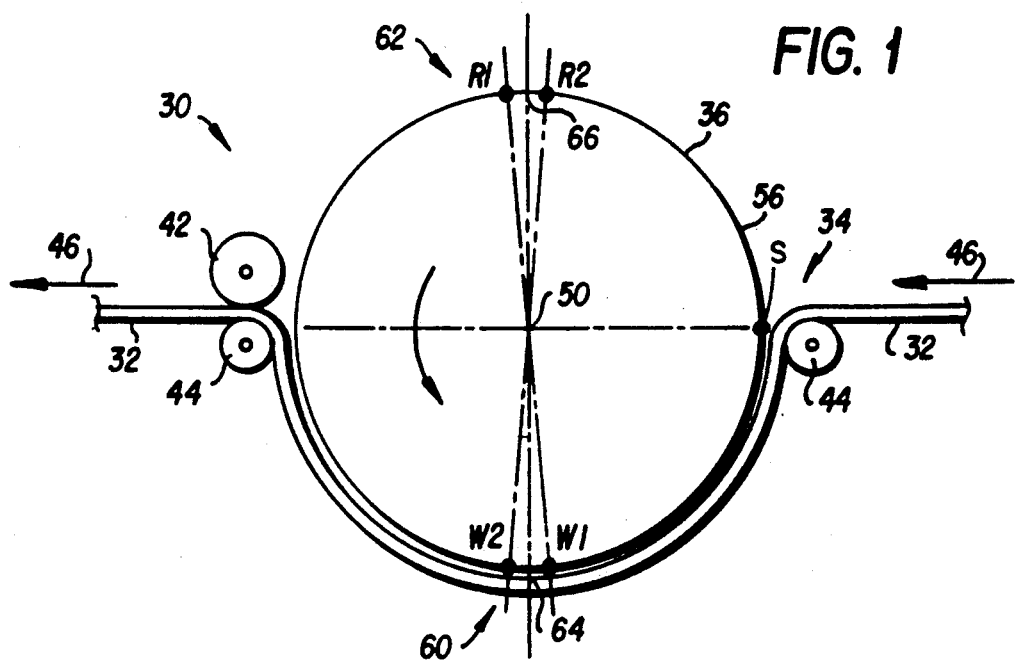
FIG. 1 is a schematic a view of head placement on a drum of a helical scan system of an embodiment of the invention.

FIG. 1 shows drum and transport portions of a helical scan system 30 for recording digital information on magnetic tape 32. The helical scan system 30 includes a tape transport 34 and a rotating drum 36.

The tape transport 34 includes a capstan 42 and two tape guides 44. In conventional manner, the capstan 42 is rotated by an unillustrated capstan drive motor in order to move the tape 32 in a direction of tape travel indicated by arrows 46. In the illustrated embodiment, the capstan 42 rotates to transport the tape 32 at a speed on the order of about one-half inch per second

Drum and Head Structure

Figure 2:
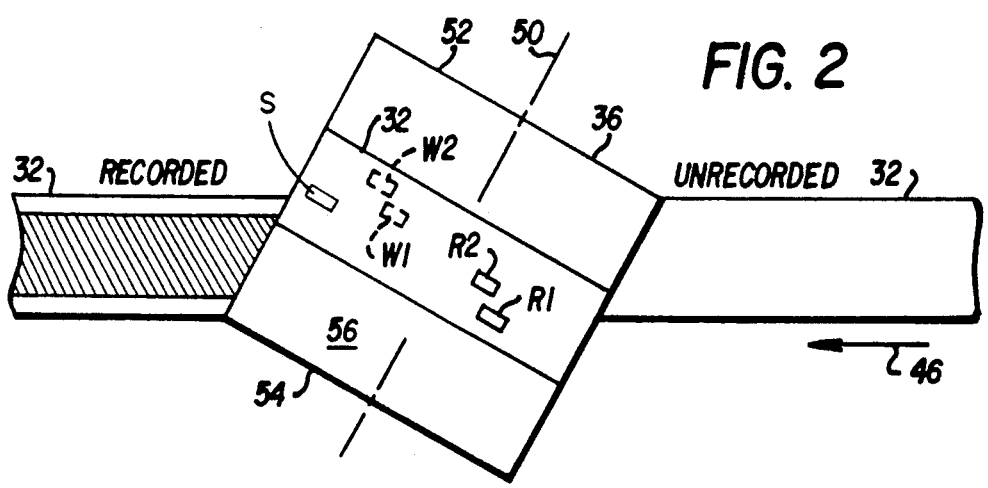
FIG. 2 is a schematic view of the helical scan system of the embodiment of FIG. 1 recording stripes on magnetic tape.

The drum 36 is rotatable about drum axis 50. The drum is rotated at a velocity of about 1800 rpm by an unillustrated drum motor. An unillustrated tachometer detects rotations of the drum motor shaft, and hence of the drum, and produces a DRUM SYNC signal. As shown in FIG. 2, drum axis 50, and hence drum 36, is angularly oriented with respect to the edges and direction of travel of the tape 32. The drum 36 has a drum upper surface 52 and a drum lower surface 54, both of which are planar. The drum axis 50 is orthogonal to both the drum upper surface 52 and the drum lower surface 54. The drum 36 also has a peripheral surface 56 which wraps around the circumference of the drum 36.

The peripheral surface 56 of the drum 36 has two sets of heads mounted thereon, in particular a first set of heads comprising write heads W1 and W2 and a second set of heads comprising read heads R1 and R2. In addition, the peripheral surface 56 of the drum 36 has a servo head S mounted thereon.

The heads W1, W2, R1, and R2 are mounted to generate helical stripes on the magnetic tape 32 in the manner shown in FIG. 6. Heads W1 and W2 essentially simultaneously write first and second tracks of data, i.e., tracks T1 and T2, respectively, on the tape 32. Heads R1 and R2 are positioned to read tracks T1 and T2, respectively, 180 degrees after the tracks T1 and T2 are written. In this respect, although FIG. 6 shows write heads W1, W2 and read heads R1, R2 traveling over tracks T1 and T2 for the sake of depicting head placement relative to the tracks, it should be understood the read heads R1, R2 and the write heads W1, W2 cannot simultaneously be over the tracks in the manner depicted in FIG. 6. Likewise, the inclusion of the servo head S in FIG. 6 is merely to show the position of the servo head S relative to the tracks T1 and T2, and not in relationship to the read heads R1, R2 or the write heads R1, R2.

The mounting and placement of the heads W1, W2, R1, and R2 are explained further in U.S. Pat. No. 5,142,422, and entitled DUAL CHANNEL HELICAL SCAN RECORDER, which is incorporated herein by reference.

FIG. 6 shows a plurality of helical stripes recorded on magnetic tape 32 by the helical scan system 30, and the ultimate paths of travel of the heads W1, W2, R1, and R2, as well as the servo head S over the helical stripes. The direction of movement of the heads is depicted by arrow 78 in FIG. 6.

System Structure

Figure 4:
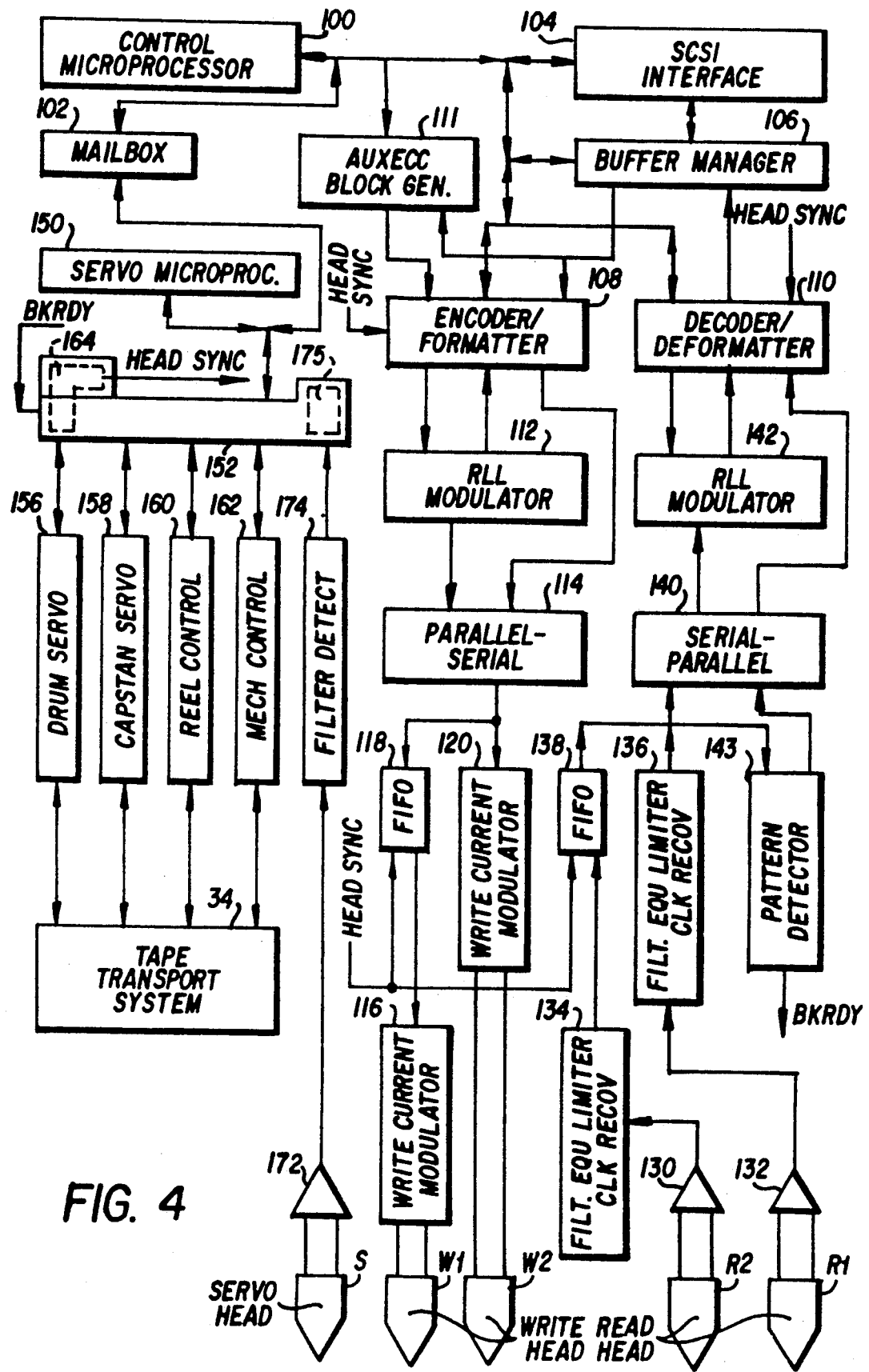
FIG. 4 is a schematic view of the helical scan system according to the embodiment of FIG. 1.

FIG. 4 illustrates the overall helical scan system 30, including the read heads R1, R2, the write heads W1, W2, and the servo head S. The helical scan system 30 further includes a control microprocessor 100 which communicates primarily with a mailbox 102; a SCSI interface 104; a data buffer manager 106; an encoder/formatter 108; a decoder/de-formatter 110; and, an AUXECC block generator 111.

Figure 10:
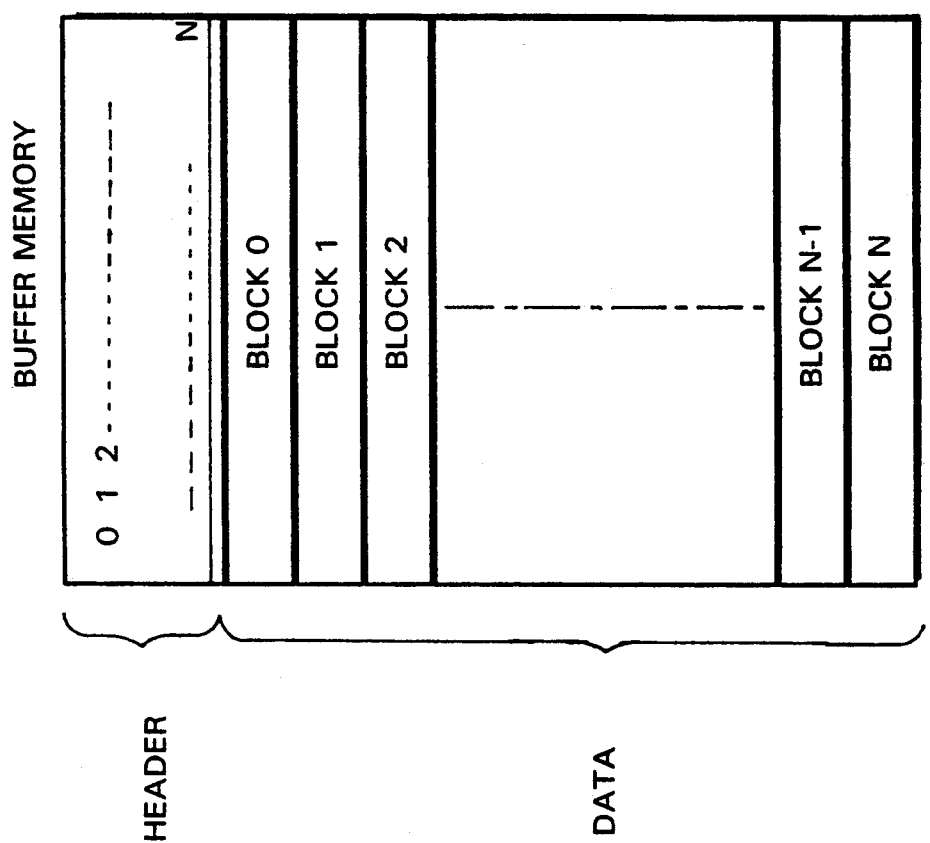
FIG. 10 is a schematic illustration depicting a memory organization scheme for a data buffer according to an embodiment of the invention.

The data buffer manager 106 comprises a data buffer which includes 1 MByte of DRAM is organized as a 9-bit wide, dual-port, circular memory. The data buffer is schematically illustrated in FIG. 10. Data transfers between the data buffer manager 106 and the SCSI interface 104, the encoder/formatter 108, the decoder/deformatter 110, and the AUXECC block generator 111 occur asynchronously or synchronously. Logical user data blocks are formatted into physical blocks in the data buffer 106 for recording onto tape.

The AUXECC block generator 111 produces auxiliary error correction blocks for recording error operation of the AUXECC block generator is described in abandoned U.S. patent application Ser. No. 07/434,009, filed Nov. 9, 1989, entitled ERROR CORRECTION METHOD AND APPARATUS, and U.S. Pat. No. 5,111,463 also entitled ERROR CORRECTION METHOD AND APPARATUS, both of which are incorporated herein by reference.

The encoder/formatter 108 receives data blocks from the data buffer manager 106 and from the AUXECC block generator 111. The encoder/formatter 108 performs a variety of functions, including appending error correction code (ECC) information, inserting synchronization markers, inserting search fields, and inserting servo fields and perform interleave sequencing of bytes.

The encoder/formatter 108 transmits the data blocks and appended information to a RLL Modulator 112 which performs the run-length encoding of the data stream by translating each 8 bit byte to a 10-bit word. The 10-bit word is then transmitted to a bit serializer 114. The bit serializer 114 is connected to a write driver circuit 116 (for write head W1) through a FIFO register 118, and to a write driver circuit 120 (for write head W2). The function of the FIFO register 118 will be explained below in connection with the description of the write operation of the helical scan system 30.

The read heads R2 and R1 are connected to preamplifiers 130 and 132, respectively, for amplifying a read signal. The preamplifiers 130 and 132 are connected to signal conditioning circuits 134 and 136, respectively. The signal conditioning circuits 134 and 136 include circuits for amplitude sensing, equalization, and data clocking and detection.

The signal conditioning circuit 134 is connected to FIFO register 138, which in turn is connected to a serial-to-parallel converter 140. The signal conditioning circuit 136 is connected directly to the serial-to-parallel converter 140.

The serial-to-parallel converter 140 is connected to an RLL De-Modulator 142 and to a pattern detector circuit 143. The RLL Read Modulator basically performs the inverse operations of the corresponding RLL Write Modulator 112.

The pattern detector 143 monitors the incoming stream of data in order to recognize a synchronization field. When the pattern detector 143 has recognized a predetermined number of synchronization fields having a predetermined spacing, the pattern detector 143 generates a BKRDY signal. In addition, the pattern detector 143 supplies to the serial-parallel converter 140 synchronizing signals necessary for the operation of the converter 140.

The RLL De-Modulator 142 is connected to the decoder/de-formatter 110. The decoder/de-formatter 110 assembles data blocks and performs error correction.

The microprocessor 100 communicates through its mailbox 102 with a servo microprocessor 150 and a motion control system 152. The motion control system 152 includes a dedicated microprocessor for communicating with a drum servo 156; a capstan servo 158; reel control circuits 160; and a mechanical controller 162. In addition, upon receipt of the BKRDY signal generated by the pattern detector 143, the motion control system 152 includes circuitry, herein called HEAD SYNC generator 164, for developing a HEAD SYNC signal. The HEAD SYNC generator 164 is described in U.S. Pat. No. 5,068,757 entitled METHOD AND APPARATUS FOR SYNCHRONIZING TIMING SIGNALS, which is incorporated herein by reference. The HEAD SYNC signal is high when the read heads R1 and R2 are over the helical stripes of Track 1 and Track 2. The HEAD SYNC signal is low when the write heads W1 and W2 are over the stripes of Track 1 and Track 2.

The motion control system 152 also communicates with sensor interface circuits for the various unillustrated elements including the following: a drum tachometer; a capstan tachometer; a reel tachometer; an end of tape (EOT) detector; and, a beginning of tape (BOT) detector. As shown in FIG. 4, the tape transport system 34 is connected to the drum servo 156, the capstan servo 158, the reel control 160, and the mechanical controller 162.

The servo head S has its output signal connected to preamplifier 172. The output of the servo preamplifier 172 is applied to a filter and detection circuit 174 which filters the amplified signal and for detecting the servo signals recorded on tape. The filter and detection circuit 174 is in turn connected to a servo tracking circuit 175 included in the motion control system 152. The servo tracking circuit 175 is further described below, and understood in detail by reference to U.S. patent application Ser. No. 07/433,977, filed Nov. 9, 1989, entitled SERVO TRACKING FOR HELICAL SCAN RECORDER, which is incorporated herein by reference.

Tape Format

FIG. 5 depicts the format of magnetic tape 32 for the helical scan system 30. The tape 32 has a physical beginning of tape (PBOT) 300 located at the point where a translucent leader material is attached to the magnetic media. Downstream from the PBOT 300 (in the sense of direction of tape transport as shown by arrow 78) are a multitude of helical stripes formed on the magnetic tape media. The helical stripes contain, of course, the information written by the write heads W1 and W2 and read by the read heads R1 and R2. The format of the helical stripes is discussed subsequently in connection with FIGS. 6 and 7. At the end of the tape 32 is a physical end of tape (PEOT) 302.

Since the helical scan system 30 is a dual azimuthal system, in a write mode odd numbered helical stripes are written at a first azimuthal angle A1 by write head W1 and even numbered helical stripes are written at a second azimuthal angle A2. In a read or readback mode, odd numbered helical stripes are read at a first azimuthal angle A1 by write head W1 and even numbered helical stripes are read at a second azimuthal angle A2. As can be discerned from the foregoing, the first azimuthal angle A1 is +20 degrees; the second azimuthal angle A2 is −10 degrees As used hereinafter, any helical stripe written by write head W1 or read by read head R1 is referred to as "Track 1". Likewise, any helical stripe written by write head W2 or read by read head R2 is referred to as "Track 2".

Tape Format: Track 1

Figure 7A:
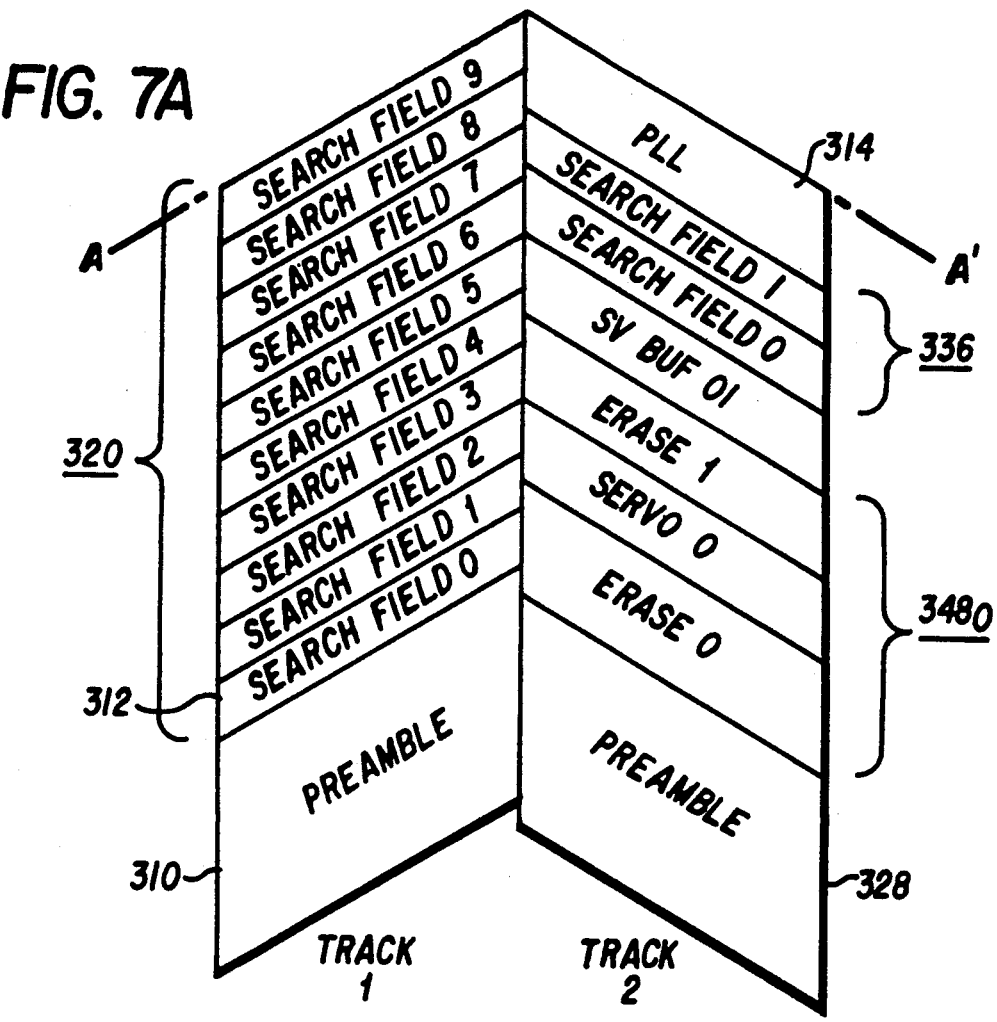
FIGS. 7A-7C are schematic views depicting the format of Track 1 and Track 2 of a magnetic tape recorded by or readable by the helical scan system of the embodiment of FIG. 1.
Figure 7B:
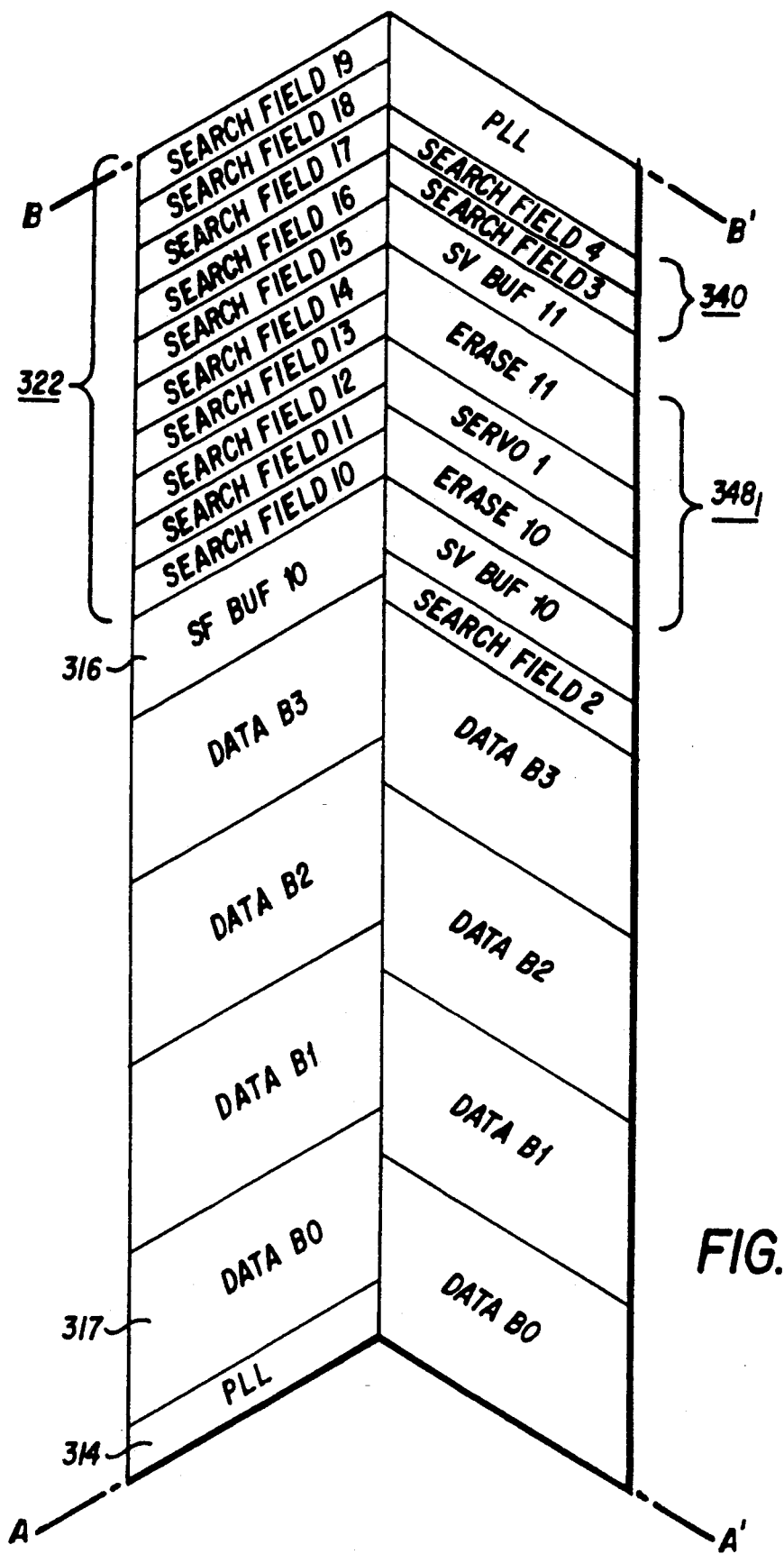
Figure 7C:
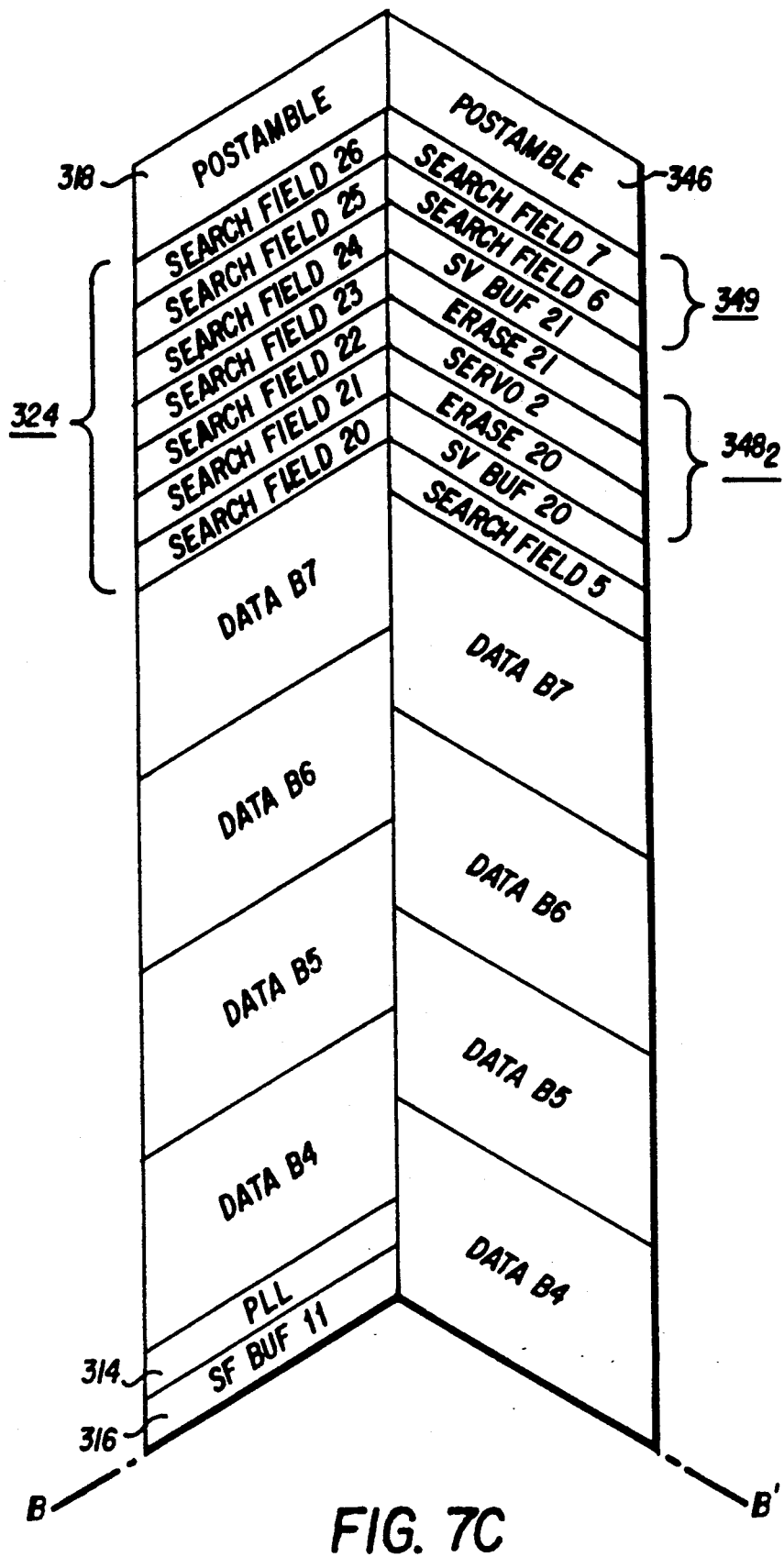

As indicated above, any helical stripe written by write head W1 or read by read head R1 is referred to as "Track 1". As shown in FIGS. 7A–7C, Track 1 begins with begins with a Preamble field 310 and further includes a plurality of search fields 312; a plurality of data phase lock loop (PLL) fields 314; a plurality of search field buffers 316; a plurality of data blocks 317; and, a postamble 318. These fields are arranged in the following order (as reflected in FIGS. 7A–7C): Preamble 310; a group 320 of ten search fields (SF0–9); a first PLL field 314; four data blocks 317 (blocks B0–B3); a search field buffer 316 (SF BUF 10); a group 322 of ten search fields (SF10–19); a search field buffer 316 (SF BUF 11); a second PLL field 314; four data blocks 317 (blocks B4–B7); a group 324 of seven search fields (SF20–26); and, the postamble 318.

Tape Format: Track 2

Any helical stripe written by write head W2 or read by read head R2 is referred to as "Track 2". As shown in FIGS. 7A–7C, Track 2 is formatted to have the following fields (in the following order): a preamble 328; a first erase field 330 ("ERASE 0"); a first servo tone area (also known as "SERVO 0" or "ST0"); a second erase field 330 ("ERASE 1"); a synchronization field known as SV BUF 01; a group 336 of search fields (SF0-1); a PLL field 314; four data blocks 317 (B0-B3); search field SF2; a synchronization field known as SF BUF 10; a third erase field ("ERASE 10"); a second servo tone area (also known as "SERVO 1" or "ST1"); a fourth erase field 330 ("ERASE 11"); a synchronization field known as SF BUF 11; a group 340 of two search fields (SF3-4); a PLL field 314; four data blocks (B4-B7); search field SF5; a synchronization field SV BUF 20; a fifth erase field 330 ("ERASE 20"); a third servo tone area (also known as "SERVO 2" or "ST3"); a sixth erase field 330 ("ERASE 21"); synchronization field SV BUF 21; a group 344 of search fields (SF6-7); and, a postamble 346.

The synchronization fields SV BUF consist of 160 consecutive digital "1"s for enabling a voltage controlled oscillator in the read circuits to lock onto data.

Tape Format: Data Blocks

Figure 8:
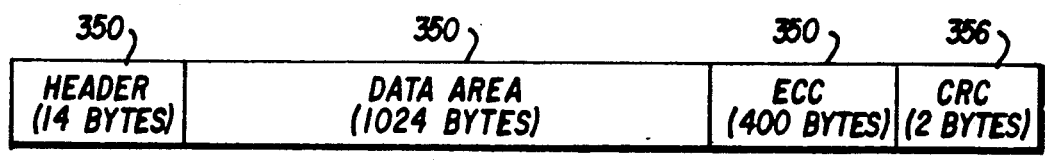
FIG. 8 is a schematic view depicting the format of a physical data block included on a stripe of magnetic tape recorded by or readable by the helical scan system of the embodiment of FIG. 1.

Each data block contains certain header information, including a BLOCK ID and PHYSICAL BLOCK ID, the combination of which is unique for each block. The format of a physical data block is illustrated in FIG. 8 and more fully explained in abandoned U.S. patent application Ser. No. 07/069,132, filed Jul. 2, 1987, entitled METHOD AND APPARATUS FOR DATA BUFFER MANAGEMENT, and U.S. Pat. No. 4,835,628, entitled APPARATUS AND METHOD FOR FORMATTING AND RECORDING DIGITAL DATA ON MAGNETIC TAPE, both of which re commonly assigned herewith and incorporated by reference herein.

As used herein, "user data" and "user block" refer to the non-header portion of each block which is ultimately transmitted via the SCSI Interface 104 to a utilization device, such as a host computer.

Structure: Memory Organization

Figure 9:
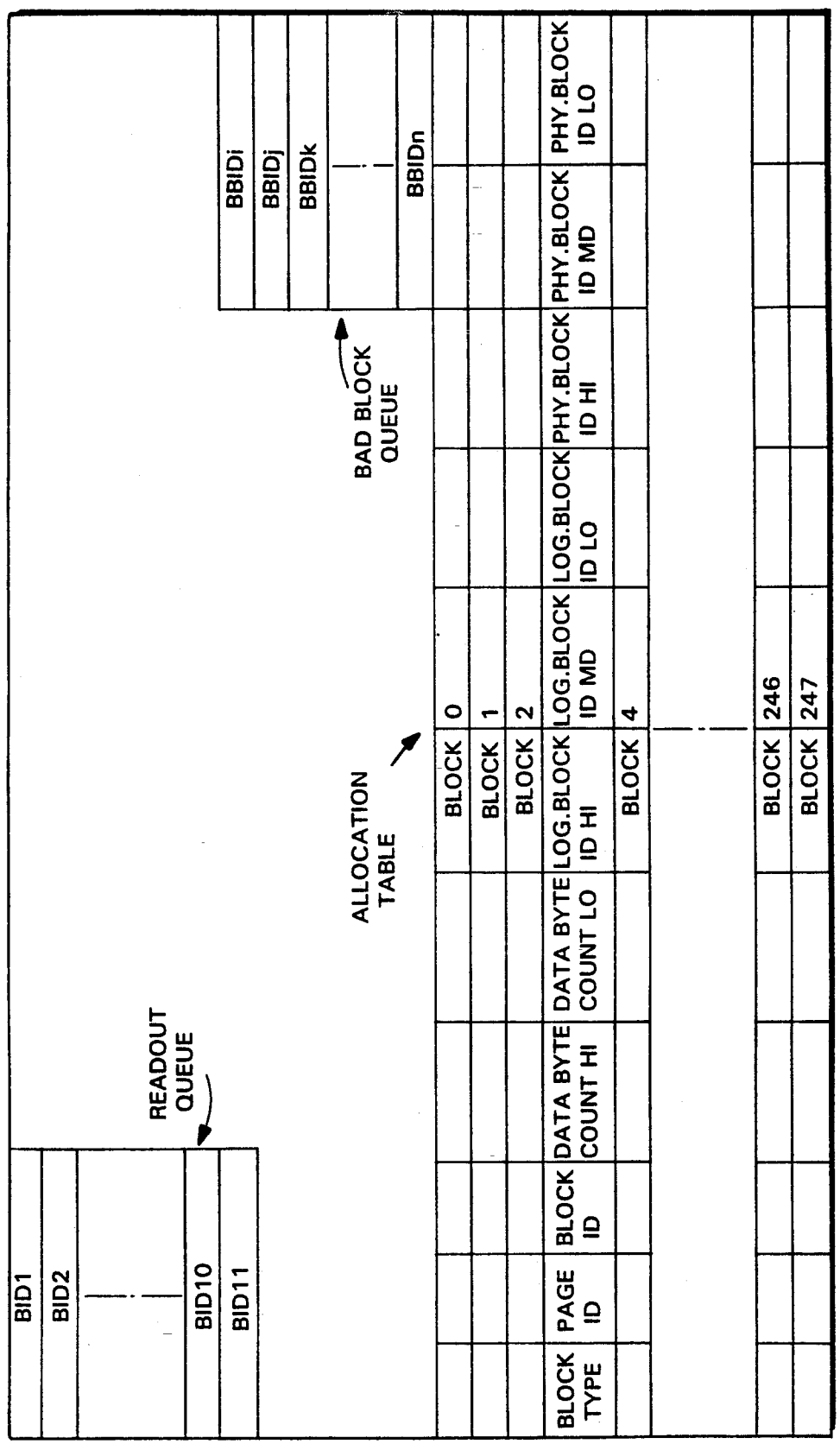
FIG. 9 is a schematic illustration depicting a portion of a memory for a control microprocessor, which memory includes an allocation table according to an embodiment of the invention.

FIG. 9 schematically illustrates portions of a RAM memory associated with the control microprocessor 100. The RAM memory of FIG. 9 includes an allocation table. The allocation table of FIG. 9 has stored therein certain parameters for a plurality of blocks, shown as blocks 0-N. In FIG. 9, each block corresponds to a row of the allocation table. The parameters stored in the allocation table for each block include block header information, including the BLOCK ID and PHYSICAL BLOCK ID parameters which are unique to each block.

FIG. 10 is a schematic view of the memory organization scheme of the data buffer accessed by the buffer manager 106. When a user block of data is recognized by the decoder/de-formatter 110, the entire user block is transmitted to the data buffer of FIG. 10 where the user block is stored at an appropriate address in the data buffer memory.

Tape Format: Servo Fields

The servo fields 348 are provided only on Track 2 and are read by the servo head S. Each servo field 348 comprises one servo data tone burst (1.42 MHz) surrounded by an erase (margin) tone (4.27 MHz). Each servo field 348 is sandwiched by a preceding and succeeding servo buffer (SV BUF), which happens to be a synchronization field. As shown in FIGS. 7A-7C, servo field $348_0$ occurs near the beginning of Track 2; servo field $348_1$ occurs near the middle of Track 2; and, servo field $348_2$ occurs near the end of Track 2.

Further details of the recording parameters of the helical scan system 30, and of the format of Track 1 and Track 2, are understood with reference to U.S. Pat. No. 5,142,422 entitled DUAL CHANNEL HELICAL SCAN RECORDER, which is incorporated herein by reference.

Structure: Servo Tracking

Figure 3:
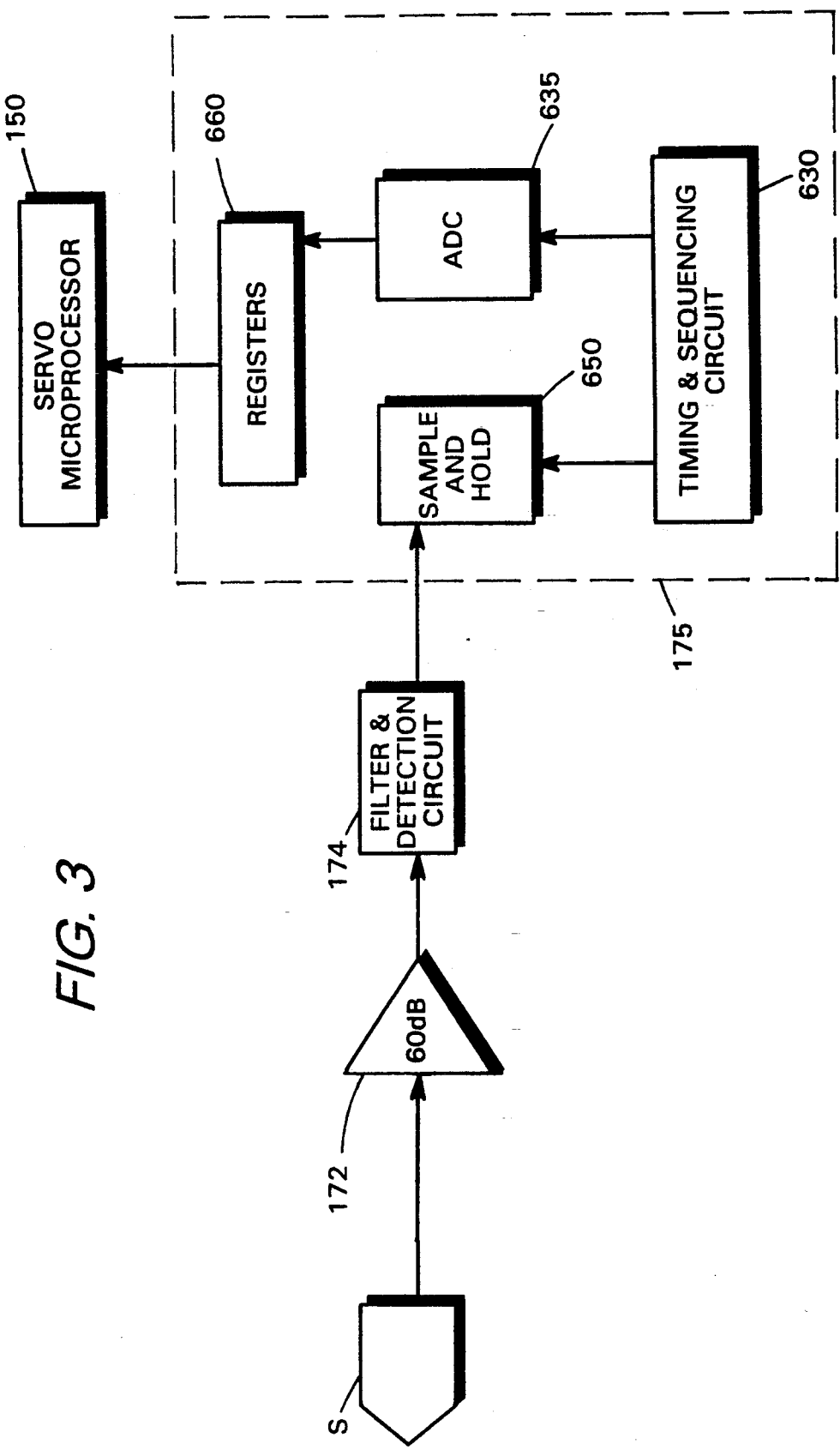
FIG. 3 is a schematic view of a servo tracking circuit, together with the servo head, a filter detection circuit, and a servo microprocessor, included in the helical scan system of the embodiment of FIG. 1.

As shown in FIG. 4, servo head S is connected to a servo filter detector circuit 174, which in turn is connected to a servo tracking circuit 175 included in the motion control system 152. FIG. 3 shows the servo tracking circuit 175, together with the servo head S, the filter detector circuit 174, and the servo microprocessor 150 included in the motion control system 152. The servo head S is connected to the amplifier 172, which in turn is connected to the filter and detection circuit 174.

The servo tracking circuit 175 shown in FIG. 3 includes a timing and sequencing circuit 630; an analog-to-digital converter (ADC) 635; a sample and hold circuit 650; and, a bank of amplitude registers 660. The detailed structure of the timing and sequencing circuit 630 is understood with reference to U.S. Pat. No. 5,068,757 entitled SERVO TRACKING FOR HELICAL SCAN RECORDER, which is incorporated herein by reference.

The sample and hold circuit 650 is connected to receive the amplified peak signal from the servo head S as developed by the filter and detector circuit 174. The sample and hold circuit 650 is connected to apply the sample signal held therein to the analog-to-digital converter 635. The analog-to-digital converter 635 is connected is apply its converted contents, under the control of the timing and sequencing circuit 630, to the register bank 660. The amplitude register bank 660 is connected to have its contents made available to the servo microprocessor 150.

Operation

As mentioned above, the helical scan system 30 has servo head S (see FIG. 1) which follows Track 1 in the manner generally shown in FIG. 6. In following Track 1, the servo head S reads servo areas ST0, ST1, and ST2 provided on two adjacent tracks (Track 2). The servo tone areas ST0, ST1, and ST2 are the areas where the 1.42 MHz signal is recorded.

In the above regard, in following Track 1, the servo head S first encounters the first servo tone areas ST0 on Tracks 2. The values of the first servo tone areas ST0 are stored in the register bank 660 and subsequently accessed by the servo microprocessor 150. Similarly, near the middle of Track 1 the servo head encounters tone servo areas ST1 on Tracks 2. The amplitudes of the second servo tone areas ST1 are then stored in the register bank 660 and subsequently accessed by the servo microprocessor 150. Near the end of Track 1 the servo head encounters servo tone areas ST2 on Tracks 2. The amplitudes of the third servo tone areas ST2 are then stored in the register bank 660 and subsequently accessed by the servo microprocessor 150.

Figure 11:
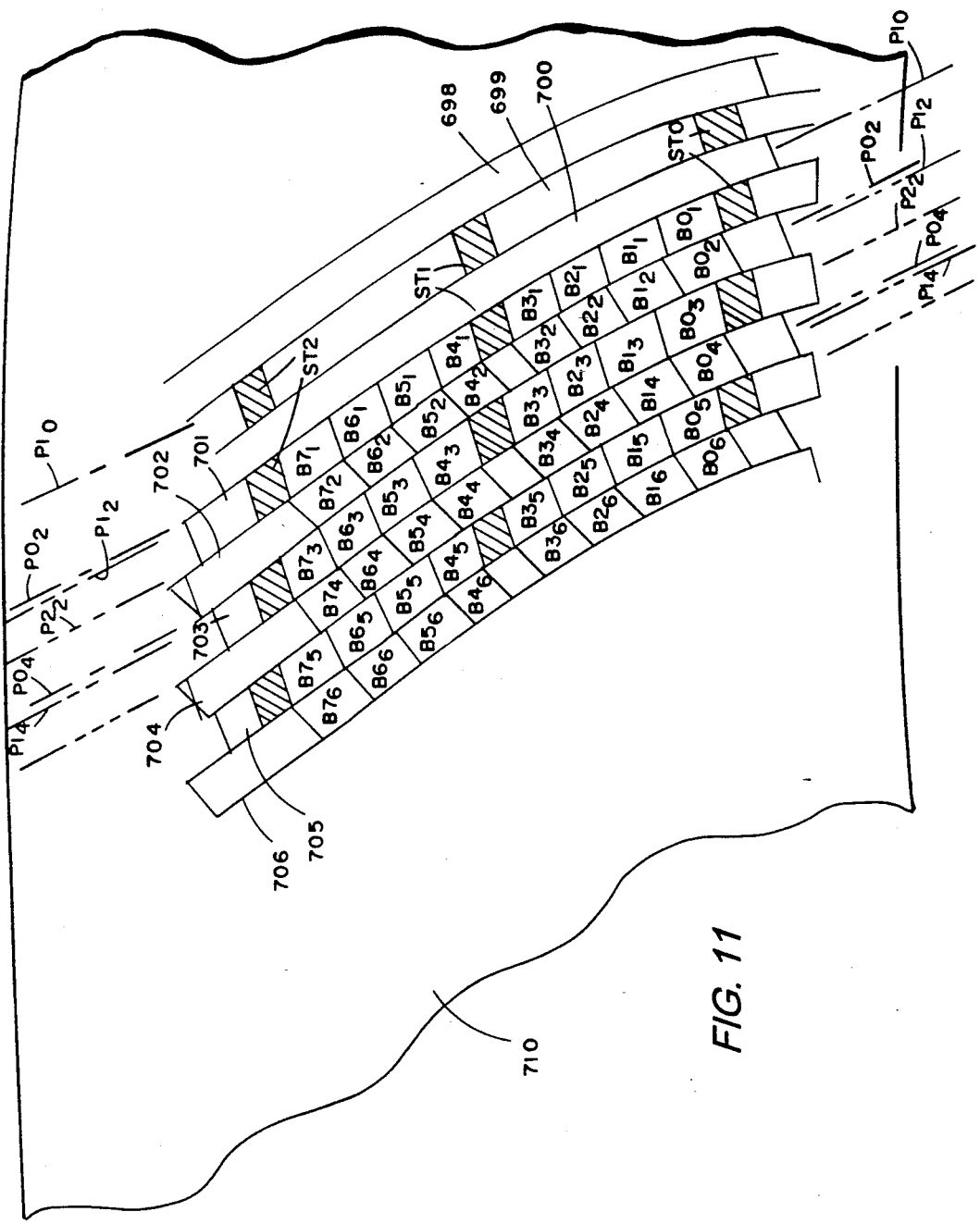
FIG. 11 is a schematic illustration depicting various azimuthal paths across distorted tracks appearing on magnetic tape during a tape read operation.

FIG. 11 is a simplified illustration of a plurality of distorted tracks or stripes 698-706 recorded on a tape 710. As used herein, the terms "track" and "stripe" are used interchangeably. The distorted tracks of FIG. 11 are distorted in the sense that the tracks are each curved rather than being straight. Although not shown in as much detail in FIG. 11, the tracks 698-705 have the same format as the tracks of FIG. 7. In this respect, each track 698-706 has eight data blocks recorded thereon. For the sake of the ensuing discussion, the data blocks on tracks 701-796 are numbered as data blocks $B0_x$, $B1_x$, ... $B7_x$ (with x = 1 for track 701, x = 2 for track 702, and so forth). For Track 2 type tracks (e.g., tracks 701, 703, and 705), four data blocks (data blocks $B0_x$, $B1_x$, ... $B3_x$) are recorded between servo zones ST0 and ST1 and four data blocks (data blocks $B4_x$, $B5_x$, ... $B7_x$) are recorded between servo zones ST1 and ST2.

If the tracks 701-706 of FIG. 11 were straight (i.e., not curved tracks), the servo head S would follow the straight line azimuthal paths denoted by the lines $P0_2$ (directly over the center of track 702, straddling tracks 701 and 703) and $P0_4$ (directly over the center of track 704, straddling tracks 701 and 703). However, in view of the curved nature of the tracks 701-706, the servo head S actually follows original azimuthal paths $P1_2$ and $P1_4$ shown in FIG. 11 as explained below.

In the above regard, suppose that, prior to encountering track 700, the servo head S had followed relatively straight paths with the result that the servo head S is set to travel the path $P1_0$ over track 700. The further operation of the servo tracking system of the present invention is described below with respect to two alternate modes: the data block gap detection mode and the servo amplitude comparison mode.

Operation: Data Block Gap Detection Mode

The data block gap detection mode is described hereinafter by using FIG. 11 to provide illustrative data for filling the data buffer of FIG. 10 and the allocation table of FIG. 9.

In the data block gap detection mode, after travelling the path $P1_0$ over track 700, the servo head S travels the paths $P1_2$ and $P1_4$ over the respective tracks 702 and 704, as illustrated in FIG. 11. As the servo head S travels the path $P1_2$ over the track 702, the servo head S attempts to pick up the servo signals recorded in each of the servo zones ST0, ST1, and ST2 recorded on the tracks 701 and 703. As read head R2 travels an original azimuthal path over track 701 which is parallel to path $P1_2$, the read head R2 attempts to read each of the data blocks B0-B71 recorded on track 701.

It will be appreciated from FIG. 11 that the curved nature of track 701, particularly the degree of curvature at the end of track 701, precludes read head R2 from being able to read all the data blocks recorded on track 701. In following the original azimuthal path which read head R2 must follow when servo head S follows path $P1_2$, the read head R2 will necessarily travel over and read only some of the data blocks recorded on the track. In this regard, the original azimuthal path traversed by the read head R2 in FIG. 11 enables head R2 to read data blocks $B0_1$ through $B5_1$ recorded on track 701, but the original azimuthal path traversed by read head R2 causes read head R2 to pass too far to the right of track 701 for read head R2 to read data blocks $B6_1$ and $B7$.

The data blocks $B0_1$ through $B5_1$ read from track 701 are stored in the data buffer of FIG. 10, and the corresponding BLOCK IDs for data blocks $B0_1$ through $B5_1$ are stored in the allocation table of FIG. 9.

The original azimuthal path traversed by the read head R1 over the track 702 is essentially the same path traversed by the servo head, i.e., path $P1_2$. From the preceding discussion of the reading of data blocks from track 701, it should be understood that read head R1 is similarly able to read data blocks $B0_2$ through $B5_2$ on track 702, but unable to read data blocks $B6_2$ and $B7_2$. Accordingly, the data blocks $B0_2$ through $B5_2$ read from track 702 are stored in the data buffer of FIG. 10, and the corresponding BLOCK IDs for data blocks $B0_2$ through $B5_2$ are stored in the allocation table of FIG. 9.

Thus, after the read head R1 has attempted to traverse the track 706 of FIG. 11, the data buffer of FIG. 10 will have stored therein the first six data blocks of each track 701-706 (e.g., data blocks $B0_1$ through $B5_1$, $B0_2$ through $B5_2$, and so forth). Likewise, the allocation table of FIG. 9 will have stored therein the BLOCK IDs for the first six data blocks of each track 701-706. The last two data blocks for tracks 701-706 will not be stored in the data buffer of FIG. 10, nor will the BLOCK IDs of those last two data blocks per track be stored in the allocation table of FIG. 9. Accordingly, there are "gaps" in the data buffer of FIG. 10 corresponding to the last two data blocks per track.

Figure 12:
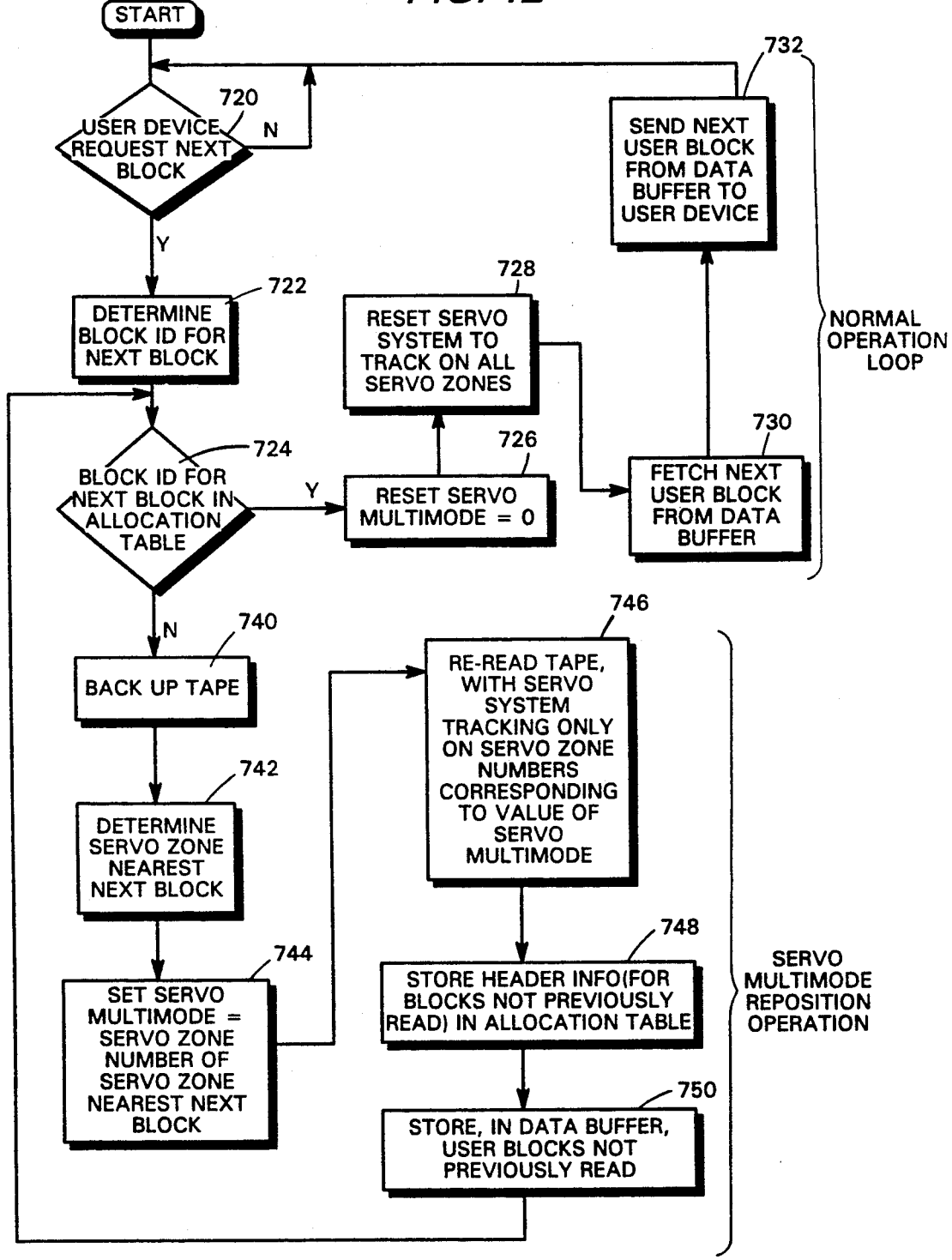
FIG. 12 is a schematic illustration of steps executed in a data block gap detection mode of the invention.

Having provided illustrative data blocks in the data buffer of FIG. 10 and corresponding BLOCK IDs in the allocation table of FIG. 9, the steps executed by the control microprocessor 100 during the data block gap detection mode are understood with reference to FIG. 12. FIG. 12 shows even numbered steps 720-732 executed during a normal operation loop, and even numbered steps 740-750 executed during a servo multimode reposition operation.

In the normal operation loop of FIG. 12, at step 720 a user device requests, via the SCSI Interface 104, a next block from the data buffer of FIG. 10. At step 106 the data buffer manager 106 determines the BLOCK ID for the next block requested by the user device. In this respect, the user device requests blocks in sequential order, so that the next requested block will have a BLOCK ID that equals the previous BLOCK ID incremented by one.

At step 724 the data buffer manager 106 checks to determine if the BLOCK ID for the next requested block is in the allocation table of FIG. 9. Under normal operating conditions, the sought BLOCK ID is in the allocation table, meaning that the next requested data block is in the data buffer of FIG. 10.

In the normal operating condition wherein the next block is located in the data buffer at step 724, the value of a four-way switch SERVO MULTIMODE is reset at zero. When the switch SERVO MULTIMODE has a zero value, the servo microprocessor 150 enables the servo head S to track on all servo zones (i.e., servo zones ST0, ST1, and ST2) provided on the Track 2 stripes. In tracking on all servo zones, the servo microprocessor 150 considers the amplitudes of each of the servo zones ST0, ST1, and ST2 in determining the setting of the servo head S.

As explained hereinafter, when the switch SERVO MULTIMODE has a "1" value, the servo microprocessor 150 enables the servo head S to track only on servo zone ST0; when the switch SERVO MULTIMODE has a "2" value, the servo microprocessor 150 enables the servo head S to track only on servo zone ST1; when the switch SERVO MULTIMODE has a "3" value, the servo microprocessor 150 enables the servo head S to track only on servo zone ST2.

As a result of the resetting of the switch SERVO MULTIMODE at step 726, at step 728 the control microprocessor 100 instructs the servo microprocessor 150 to allow the servo tracking circuit 175 to use the amplitude values of all servo zones ST0, ST1, and ST2.

Having located the next block in the data buffer at step 724, at step 730 that next block is fetched from the data buffer of FIG. 10 and at step 732 the user data from that next data block is sent (via the SCSI interface 104) to the user device.

In the normal operation loop, the control microprocessor 100 awaits an interrupt from the SCSI interface 104 and, when an interrupt requesting another data block is received (step 720), proceeds to execute the steps 722 and 724 as described above.

In the context of the preceding discussion regarding the storage in the allocation table of FIG. 9 and data buffer of FIG. 10 based on the example of FIG. 11, should the user device request, at step 720 of FIG. 12, the data block $B6_1$, the data buffer manager 106 would, at step 724, determine that the data block $B6_1$ is not present in the data buffer of FIG. 10. Upon such a negative determination at step 724 of FIG. 12, execution would branch into the servo multimode reposition operation as described below. Thus, the control microprocessor 100 together with the data buffer manager 106 serve as a track distortion detection means which use block-identifying information (BLOCK IDs) to determine whether any blocks expected to be read during the traversal of said original azimuthal paths were not read, with that block-identifying information serving to provide an indication of track curvature.

In the servo multimode reposition operation, at step 740 the tape is rewound or backed up so that the read heads R1 and R2 and the servo head S are considerably upstream from the track that contains the expected but un-read (e.g., missing) data block. For example, if the read head R1 had just read track 706 as postulated previously, then the tape would be rewound so that the heads R1, R2, and S are in a neighborhood of about fifty to sixty tracks earlier. The rewind operation is accomplished through a directive to the motion control system 152, which in turn controls the reel control 160.

At step 742 the control microprocessor 100 determines which of the servo zones (i.e., servo zone ST0, ST1, or ST2) is the closest zone to the missing data block. The control microprocessor 100 makes this calculation knowing the BLOCK ID of the requested but missing block and knowing the precise format of the tape. In this regard, the control microprocessor 100 knows the number of data blocks recorded per track (eight), and therefore can divide the BLOCK ID by the number eight to obtain a remainder which indicates the order of the missing block on a track. In the example under consideration, wherein data block $B6_1$ is missing from the data buffer of FIG. 10, the control microprocessor 100 determines that the missing block is the sixth block on a track. Accordingly, knowing the relative locations of the servo zones, the microprocessor knows that the servo zone ST2, a third servo zone, is the closest servo zone to the missing data block. Thus, the control microprocessor 100 serves at step 742 as servo zone selection means.

At step 744 the control microprocessor 100 sets the value of the switch SERVO MULTIMODE equal to a number of one of the servo zones. The number to which the switch SERVO MULTIMODE is set is selected in accordance with which of the servo zones satisfies a specified relationship to the next requested data block (e.g., the missing data block). In the illustrated embodiment, the specified relationship is that the selected servo zone be the zone which is physically nearest the missing block relative to the beginning of the track. Thus, in the illustrated embodiment, the number to which the switch SERVO MULTIMODE is set is the number of the servo zone nearest the next requested block (e.g., the missing block). In the example under consideration wherein data block $B6_1$ is missing from the data buffer of FIG. 10, and wherein missing data block $B6_1$ is closest to the third servo zone ST2, at step 744 the switch SERVO MULTIMODE is set equal to "3".

With the tape having been rewound at step 740, at step 746 the control microprocessor 100 initiates re-reading of the tape. However, in connection with the re-reading of the tape, the control microprocessor 100 directs the servo microprocessor 150 to track only on the servo zone having the same value as the value of switch SERVO MULTIMODE. In the example under consideration wherein the value of switch SERVO MULTIMODE is "3", at step 746 the servo microprocessor 150 would only evaluate the amplitudes of the third servo zones (i.e., zones ST2) in determining the position of the servo head S.

During the re-reading of the tape as initiated at step 746, by the time the servo head S reaches the track 702 the servo head S will travel the modified azimuthal path $P2_2$ over portions of the track 702. As a result of the setting of the value of switch SERVO MULTIMODE to "3", the selected servo zone is prioritized. The prioritization causes a filtering of the amplitudes of all but the third servo zones (ST2) on the tracks. Accordingly, as the servo head S traverses the path $P2_2$, the read head R2 will traverse a modified azimuthal path over track 701 that will enable read head R2 to read the heretofore-missing data blocks $B6_1$ and $B7_1$. Similarly, as read head R1 traverses a modified azimuthal path over track 702 (the same modified azimuthal path $P2_2$ as is traversed by the servo head S), the read head R1 will be able to read data blocks $B6_2$ and $B7_2$. Likewise, with the value of switch SERVO MULTIMODE set equal to "3", the last two blocks of other re-read tracks will also be read by the respective read heads. The re-reading continues until a the control microprocessor 100 has determined that the track with the missing data block should have been re-read.

At step 748 the control microprocessor 100 stores header information for blocks not previously read into the allocation table of FIG. 9. Similarly, at step 750, the control microprocessor 100 directs the buffer manager 106 to data blocks not previously read into the data buffer of FIG. 10. During the re-read operation of step 746 it is likely that data blocks other than missing data blocks will be read. But at steps 748 and 750 the information from blocks already successfully read is ignored so that only information from heretofore missing blocks is processed.

After completion of the servo multimode reposition operation, execution returns from step 750 back to step 724. If, at step 724, the BLOCK ID for the next requested block is in the allocation table of FIG. 9, then the switch SERVO MULTIMODE is reset at zero and the execution of the normal operation loop resumes.

Operation: Servo Amplitude Comparison Mode

Figure 13:
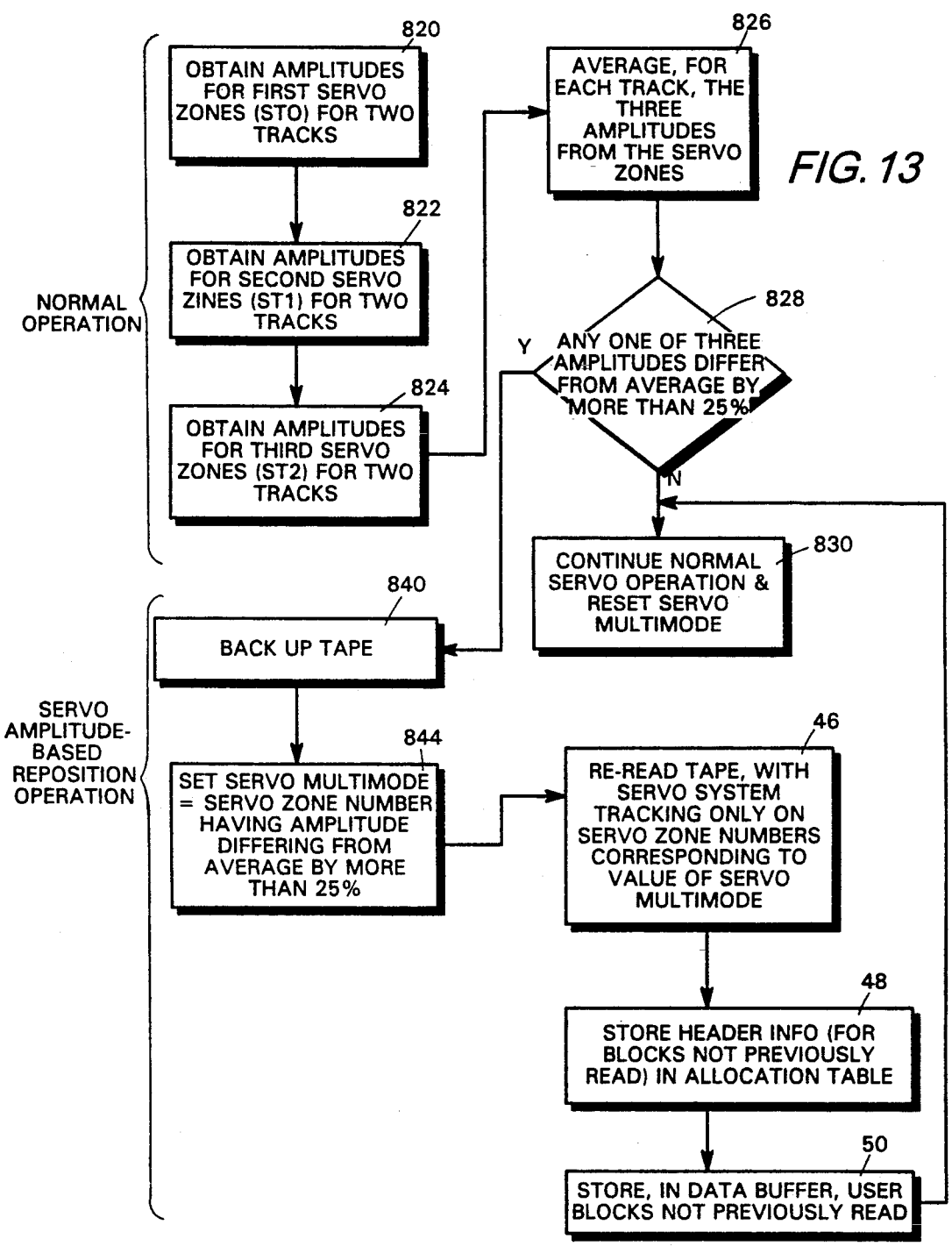
FIG. 13 is a schematic illustration of steps executed in a servo amplitude comparison mode of the invention.

Steps executed by the control microprocessor 100 and the servo microprocessor 150 are illustrated on FIG. 13. FIG. 13 shows even numbered steps 820 through 830 executed during normal operation, and even numbered steps 840 through 850 executed during a servo amplitude-based reposition operation.

As indicated above, prior to encountering track 700, the servo head S had followed relatively straight paths with the result that the servo head S is set to travel the path $P1_0$ over track 700. As the servo head S travels the path $P1_0$ over track 700, the servo head S picks up the amplitudes of the servo zones ST0, ST1, and ST2 recorded on the adjacent tracks 699 and 701. In the manner described before with reference to FIG. 3, the amplitudes of the signals from the servo zones are sampled; converted to digital by the ADC 635; stored in the register bank 660; and, accessed by the servo microprocessor 150. Step 820 of FIG. 13 shows the servo microprocessor 150 accessing a digital value indicative of the amplitude of the first servo zones (ST0); step 822 of FIG. 13 shows the servo microprocessor 150 accessing a digital value indicative of the amplitude of the second servo zones (ST1); step 824 of FIG. 13 shows the servo microprocessor 150 accessing a digital value indicative of the amplitude of the third servo zones (ST2).

After the amplitudes of all three servo zones have been obtained, at step 826 the amplitudes for each track are averaged. That is, for example, for track 699 the amplitudes of the signals from servo zones ST0, ST1, and ST2 are averaged to obtain an average amplitude.

At step 828 a determination is made as to whether the amplitudes of the signals from any of the zones STO, ST1, or ST2 of a given track differ from the average amplitude by more than a predetermined percentage, such as 25 percent. If all the amplitudes are within the predetermined percentage of the average, the servo system continues normal operation without any adjustment. In this regard, normal operation involves resetting the switch SERVO MULTIMODE to zero and tracking on all servo zones in the manner previously described.

In view of the curved nature of track 700, however, he amplitude of servo zone ST1 as picked up by the servo head S following original azimuthal path $P1_0$ is significantly different from the amplitude of servo zones ST0 and ST1. This difference results from the fact that the original azimuthal path $P1_0$ is not equally spaced between the servo zones ST2 on neighboring tracks 699 and 701 as is more nearly the case for servo zones ST0 and ST1. In the illustration of FIG. 11, it is assumed that the amplitude of the signal from servo zone STI differs from the averaged amplitude (determined at step 826 of FIG. 13) by more than 25%, with the result that the determination of step 828 requires processing to branch to the servo amplitude-based reposition operation which commences at step 840.

Thus, the control microprocessor 100, in conjunction with the servo microprocessor 150, uses the amplitudes from the servo zones for acquiring information indicative of a distorted (e.g., curved) track.

At step 840 the tape is rewound in much the same manner as occurred at step 740 of the gap detection mode illustrated in FIG. 12. At step 844 the control microprocessor 100 in conjunction with the servo microprocessor 150 determines which of the servo zones satisfies a specified relationship to a distorted portion of the track. In the illustrated embodiment, satisfying the specified relationship involves selecting the servo zone which is physically closest, relative to the beginning of the track, to the distorted portion of the track. In the example under discussion, wherein the amplitude from servo zone ST2 differed by more than 25% from the average amplitudes of zones ST0, ST1, and ST2, the third servo zone ST2 is selected. Accordingly, the value of the switch SERVO MULTIMODE is set equal to "3".

The execution of steps 846, 848, and 850 of FIG. 13 closely correspond to respective steps 746, 748, and 750 of FIG. 12. In this respect, at step 846 the tape is re-read, but with the servo microprocessor 150 tracking only on the servo zone having the same value as the value of switch SERVO MULTIMODE. In the example under consideration wherein the value of switch SERVO MULTIMODE is "3", at step 846 the servo microprocessor 150 would only evaluate the amplitudes of the third servo zones (i.e., zones ST2) in determining the position of the servo head S.

During the re-reading of the tape as initiated at step 846, by the time the servo head S reaches the track 702 the servo head S will travel the modified azimuthal path $P2_2$ over portions of the track 702. As a result of the setting of the value of switch SERVO MULTIMODE to "3", and the resultant filtering of the amplitudes of all but the third servo zones (ST2) on the tracks, as the servo head S traverses the path $P2_2$ the read head R2 will traverse a modified azimuthal path over track 701. Similarly, read head R1 traverses a modified azimuthal path over track 702 (the same modified azimuthal path $P2_2$ as is traversed by the servo head S). The re-reading continues for a predetermined time, which can vary from one revolution of the drum to a predetermined number of revolutions of the drum.

At step 848 the control microprocessor 100 stores header information for blocks not previously read into the allocation table of FIG. 9. Similarly, at step 850, the control microprocessor 100 directs the buffer manager 106 to data blocks not previously read into the data buffer of FIG. 10.

After completion of the servo amplitude-based reposition operation, execution returns from step 850 back to step 830 whereat the value of switch SERVO MULTIMODE is reinitialized at zero.

While the invention has been particularly shown and described with reference to the preferred embodiments thereof, it will be understood by those skilled in the art that various alterations in form and detail may be made therein without departing from the spirit and scope of the invention. For example, it should be understood that the present invention can be implemented in a single channel apparatus as well as a dual channel apparatus.

The embodiments of the invention in which an exclusive property or privilege is claimed are defined as follows:

1. Apparatus for reading information recorded on a storage medium in helical tracks, with each track comprising a plurality of blocks of data, with at least some of said tracks having a plurality of servo zones recorded thereon, said apparatus comprising:
   means for transporting said storage medium in a direction of medium travel;
   a rotatable drum having a portion of a peripheral surface thereof contiguous with said storage medium as said storage medium is transported therepast by said transporting means;
   reading means mounted on said drum for traversing an original azimuth path across said storage medium and for reading blocks recorded along at least a portion of the original azimuthal path;

a servo head mounted on said drum for attempting, in a normal mode, to pickup signals recorded in said plurality of servo zones recorded on said tracks;

track distortion detection means for acquiring information indicative of whether a track is distorted;

servo zone selection means for using said information acquired by said track distortion detection means in order to select one of said servo zones as having a specified relationship to a potential track distortion;

control means responsive to said servo zone selection means for causing, in a servo reposition mode, the repositioning of said servo head and for causing said servo head to follow a modified azimuthal path whereon the signal from said selected servo zone is prioritized relative to others of said servo zones, and whereby said reading means accordingly traverses a modified azimuthal path in said servo reposition mode in an attempt to read a portion of said distorted track, said modified azimuthal path being offset with respect to said original azimuthal path relative to said direction of medium travel.

2. The apparatus of claim 1, wherein each track comprises a plurality of blocks of data with each block having unique block-identifying information, wherein said reading means reads blocks including said block-identifying information recorded along at least a portion of said original azimuthal path; and wherein said track distortion detection means comprises gap detection means for using said block-identifying information to determine whether any blocks expected to be read during the traversal of said original azimuthal path were not read.

3. The apparatus of claim 1, wherein said track distortion detection means comprises means for comparing the magnitudes of the signals picked up from each of said plurality of servo zones recorded on said track.

4. The apparatus of claim 1, wherein said original azimuthal path and said modified azimuthal path are essentially linear, with said modified azimuthal path being essentially parallel to said original azimuthal path.

5. A method for reading information recorded on a storage medium in helical tracks, with each track comprising a plurality of blocks of data, with at least some of said tracks having a plurality of servo zones recorded thereon, said method comprising:

transporting said storage medium in a direction of medium travel past a rotatable drum, said rotatable drum having a portion of a peripheral surface thereof contiguous with said storage medium as said storage medium is transported therepast;

rotating said rotatable drum whereby reading means mounted on said drum traverses an original azimuthal path across said storage medium;

reading blocks recorded along at least a portion of said original azimuthal path, said blocks being read by reading means;

attempting, in a normal mode, to pickup signals recorded in said plurality of servo zones recorded on said tracks, said signals being picked up by a servo head;

acquiring information indicative of whether a track is distorted;

selecting, in accordance with said acquired information, one of said servo zones as having a specified relationship to a potential track distortion;

repositioning said servo head for causing said servo head to follow an azimuthal path whereon the signal from said selected servo zone is prioritized relative to others of said servo zones, and whereby said reading means accordingly traverses a modified azimuthal path; and, re-reading, in a servo repositioned mode, a portion of said distorted track as said reading means traverses said modified azimuthal path, said modified azimuthal path being offset with respect to said original azimuthal path relative to said direction of medium travel.

6. The method of claim 5, wherein each track comprises a plurality of blocks of data with each block having unique block-identifying information, wherein said step of reading blocks includes reading said block-identifying information recorded along at least a portion of said original azimuthal path; and acquiring of information indicative of whether a track is distorted involves using said block-identifying information to determine whether any blocks expected to be read during the traversal of said original azimuthal path were not read.

7. The method of claim 5, wherein acquiring of information indicative of whether a track is distorted involves comparing the magnitudes of the signals picked up from each of said plurality of servo zones recorded on said track.

8. The method of claim 5, wherein said original azimuthal path and said modified azimuthal path are essentially linear, with said modified azimuthal path being essentially parallel to said original azimuthal path.

9. Apparatus for reading information recorded on a storage medium in helical tracks, with each track comprising a plurality of blocks of data, with at least some of said tracks having a plurality of servo zones recorded thereon, said apparatus comprising:

means for transporting said storage medium in a direction of medium travel;

a rotatable drum having a portion of a peripheral surface thereof contiguous with said storage medium as said storage medium is transported therepast by said transporting means;

means mounted on said drum for traversing an original azimuthal path across said storage medium and for reading blocks recorded along at least a portion of the original azimuthal path;

means mounted on said drum for attempting, in a normal mode, to pickup signals recorded in said plurality of servo zones recorded on said tracks;

track distortion detection means for acquiring information indicative of whether a track is distorted;

servo zone selection means for using said information acquired by said track distortion detection means in order to select one of said servo zones as having a specified relationship to a potential track distortion;

control means responsive to said servo zone selection means for causing, in a servo reposition mode, the repositioning of said servo head and for causing said servo head to follow a modified azimuthal path whereon the signal from said selected servo zone is prioritized relative to others of said servo zones, and whereby said modified azimuthal path is traversed in said servo reposition mode in an attempt to read a portion of said distorted track, said modified azimuthal path being offset with respect to said original azimuthal path relative to said direction of medium travel.

10. The apparatus of claim 9, wherein each track comprises a plurality of blocks of data with each block having unique block-identifying information, wherein blocks including said block-identifying information recorded along at least a portion of said original azimuthal path are read; and wherein said track distortion detection means comprises gap detection means for using said block-identifying information to determine whether any blocks expected to be read during the traversal of said original azimuthal path were not read.

11. The apparatus of claim 9, wherein said track distortion detection means comprises means for comparing the magnitudes of the signals picked up from each of said plurality of servo zones recorded on said track.

12. The apparatus of claim 9, wherein said original azimuthal path and said modified azimuthal path are essentially linear, with said modified azimuthal path being essentially parallel to said original azimuthal path.

* * * * *